Jan. 30, 1945.  W. G. LUGER  2,368,312
CULTIVATOR ATTACHMENT FOR TRACTORS
Filed March 6, 1942  6 Sheets-Sheet 1

FIG. 1

INVENTOR
WILLIAM G. LUGER
By Paul, Paul & Moore
ATTORNEYS

Jan. 30, 1945.  W. G. LUGER  2,368,312
CULTIVATOR ATTACHMENT FOR TRACTORS
Filed March 6, 1942  6 Sheets-Sheet 3

INVENTOR
WILLIAM G. LUGER
By Paul, Paul & Moore
ATTORNEYS

Jan. 30, 1945. W. G. LUGER 2,368,312
CULTIVATOR ATTACHMENT FOR TRACTORS
Filed March 6, 1942 6 Sheets-Sheet 4

INVENTOR
WILLIAM G. LUGER
By Paul, Paul + Moore
ATTORNEYS

Jan. 30, 1945.  W. G. LUGER  2,368,312
CULTIVATOR ATTACHMENT FOR TRACTORS
Filed March 6, 1942   6 Sheets-Sheet 5

INVENTOR
WILLIAM G. LUGER
By Paul, Paul & Moore
ATTORNEYS

Jan. 30, 1945.  W. G. LUGER  2,368,312
CULTIVATOR ATTACHMENT FOR TRACTORS
Filed March 6, 1942  6 Sheets-Sheet 6

INVENTOR
WILLIAM G. LUGER
By Paul, Paul & Moore
ATTORNEYS

Patented Jan. 30, 1945

2,368,312

UNITED STATES PATENT OFFICE 2,368,312

CULTIVATOR ATTACHMENT FOR TRACTORS

William G. Luger, Minneapolis, Minn., assignor of one-fourth to William Sipe, Robbinsdale, Minn.

Application March 6, 1942, Serial No. 433,656

14 Claims. (Cl. 97—47)

This invention relates to new and useful improvements in cultivator attachments for tractors, and more particularly to such an attachment which may readily be used in combination with a tractor for cultivating commercial truck crops.

In the growing and cultivation of commercial truck crops, such as carrots, onions, beets and various other small crops, it is necessary that the soil or ground be kept constantly cultivated or worked adjacent to the plants, during the early growing season of the plants. Such crops are usually planted from seed, and the seeds are preferably planted by a drill or gang of drills, whereby when the plants come up, they will be disposed in substantially parallel rows which may extend the length of the field.

Commercial truck crops require early and frequent cultivation for best results, and to reduce the cost of growing such crops, truck gardeners now frequently employ tractors, or power propelled vehicles, equipped with cultivator attachments, for cultivating the crops, because there is usually less danger of damaging the plants with a tractor-operated cultivator than with a horse drawn cultivator, particularly when the plants are very small.

It is also of utmost importance to minimize manual labor, particularly in times like these when labor is at a premium. Manual labor can be reduced to a large extent by close cultivation of the plants, as it is well known that the weeds and other growth, foreign to the particular crop being grown, must be hand weeded from the uncultivated area at each side of the row. Ordinarily, cultivator attachments now commonly employed in combination with tractors for cultivating truck crops are not so constructed or arranged that real close cultivation is possible. In other words because of the inherent construction of the supporting means for the ground working tools of such attachments, it is usually necessary that the ground working tools utilized for cultivating each row, be spaced apart sufficiently to eliminate, so far as possible, the danger of the tools damaging the plants or uprooting them, which might result should the ground engaging tools shift from side to side with respect to the row, during the cultivating operation.

Most tractor cultivator attachments, as now commonly constructed, are not so supported on the tractor that the operator may readily and accurately guide the ground working tools thereof with respect to the row, independently of the traveling movement of the tractor, and this usually accounts for the relatively wider spacing which must be maintained between the tools for each row, in order that some leeway is provided for lateral shifting of the tools. When the cultivator tools are thus spaced, a relatively wide uncultivated strip or area is left at each side of the row being cultivated which must be hand weeded. This may require considerable labor and, as a result, may materially increase the cost of growing the crop.

It is therefore highly desirable that the supporting means for the ground working implements or tools of the cultivator attachment be so constructed and arranged that the operator may readily and conveniently shift the tools at will, and without effort, independently of the traveling movement of the tractor, whereby the cultivator tools for each row may be accurately guided along the plant row or rows, even though the row may not follow a straight line. By thus mounting the cultivator tool-supporting means on the tractor, the cultivator tools for cultivating each row may be spaced considerably closer together, whereby the uncultivated strip or area in each row is considerably decreased in width, thereby substantially decreasing the amount of manual labor required to hand weed each row following the cultivating operation.

An important object of the present invention, therefore, is to provide a cultivator attachment comprising a tool supporting bar having means whereby it may readily and freely be laterally adjusted or shifted with respect to the tractor, during traveling movement of the tractor, and whereby the operator sitting on the tractor may accurately guide the ground engaging tools along the row, or rows, independently of the traveling movement of the tractor.

A further object of the invention is to provide a cultivator attachment for tractors comprising a tool supporting frame mounted for vertical adjustment on the tractor and provided with gauge wheels adapted to travel in the tracks of certain of the tractor wheels, thereby to accurately gauge the depth of the tools in the ground, and whereby the soil adjacent to each side of the plant row will be cultivated to a uniform depth the entire length of the row and regardless of undulations in the surface of the ground.

A further object is to provide an attachment of the class described comprising a vertically movable supporting frame having a tool supporting bar mounted thereon and disposed crosswise of the tractor, and said tool supporting bar being adapted for longitudinal movement and having a control means located convenient to the operator's seat, whereby an operator seated on the tractor may conveniently laterally shift the tool supporting bar on the tractor, independently of the forward movement of the tractor, thereby to accurately guide the tools along the plant rows, even though the tractor may tend to slide sidewise, as when traveling along a side hill, or when the wheels at one side of the tractor travel in a dead furrow or pass through a depression or over a raised portion in the ground surface.

A further object is to provide a cultivator attachment for tractors comprising a main supporting frame mounted for vertical adjustment on the tractor and having a transversely disposed tool supporting bar mounted thereon and carrying a plurality of ground engaging tools, which may be arranged in pairs, one pair for each plant row, and said tool supporting bar being mounted for lengthwise movement in a direction transversely of the tractor, to laterally shift the cultivator tools independently of the traveling movement of the tractor, and said bar also having means for relatively rotating it thereby to swing the ground engaging tools out of the ground, to permit turning movement of the tractor at the end of each row, and whereby the tractor may be moved about from place to place with the tools out of contact with the ground.

A further object is to provide an attachment of the character described, comprising a tool supporting bar having means for floatingly supporting it on the tractor, whereby it may be freely moved in a direction transversely of the path of travel of the tractor, and foot-operated control means being located convenient to the driver's seat, whereby the driver or operator of the tractor may readily manipulate the tool supporting bar to cause each pair of ground engaging tools to accurately follow the plant row or rows, regardless of the traveling movement of the tractor, and whereby the soil may be cultivated relatively close to each side of the row without danger of damaging or uprooting any of the plants, with the result that very few weeds are left along each side of each row, which are subsequently hand weeded.

Other objects of the invention reside in the novel means provided for supporting the tool supporting bar, whereby it may readily be laterally adjusted with respect to the longitudinal center line of the tractor; in the means provided for relatively rotating the tool supporting bar to throw the ground engaging tools out of the ground, and whereby maximum clearance is provided beneath the tool supporting bar; in the means provided for locking the tool supporting bar in operative position, and whereby it cannot chatter, when the ground engaging tools are engaged with the ground; in the provision of anti-friction means for supporting the tool supporting bar whereby very little effort is required of the operator to laterally shift the tools with respect to the tractor; in the provision of a cultivator attachment of the class described which may readily be mounted upon conventional tractors; in the provision of a cultivator attachment of the class described, comprising a plurality of auxiliary ground-engaging tools mounted rearwardly of the rear wheels of the tractor; and in the simple and inexpensive construction of the attachment as a whole whereby it may be manufactured at small cost.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figure 1:
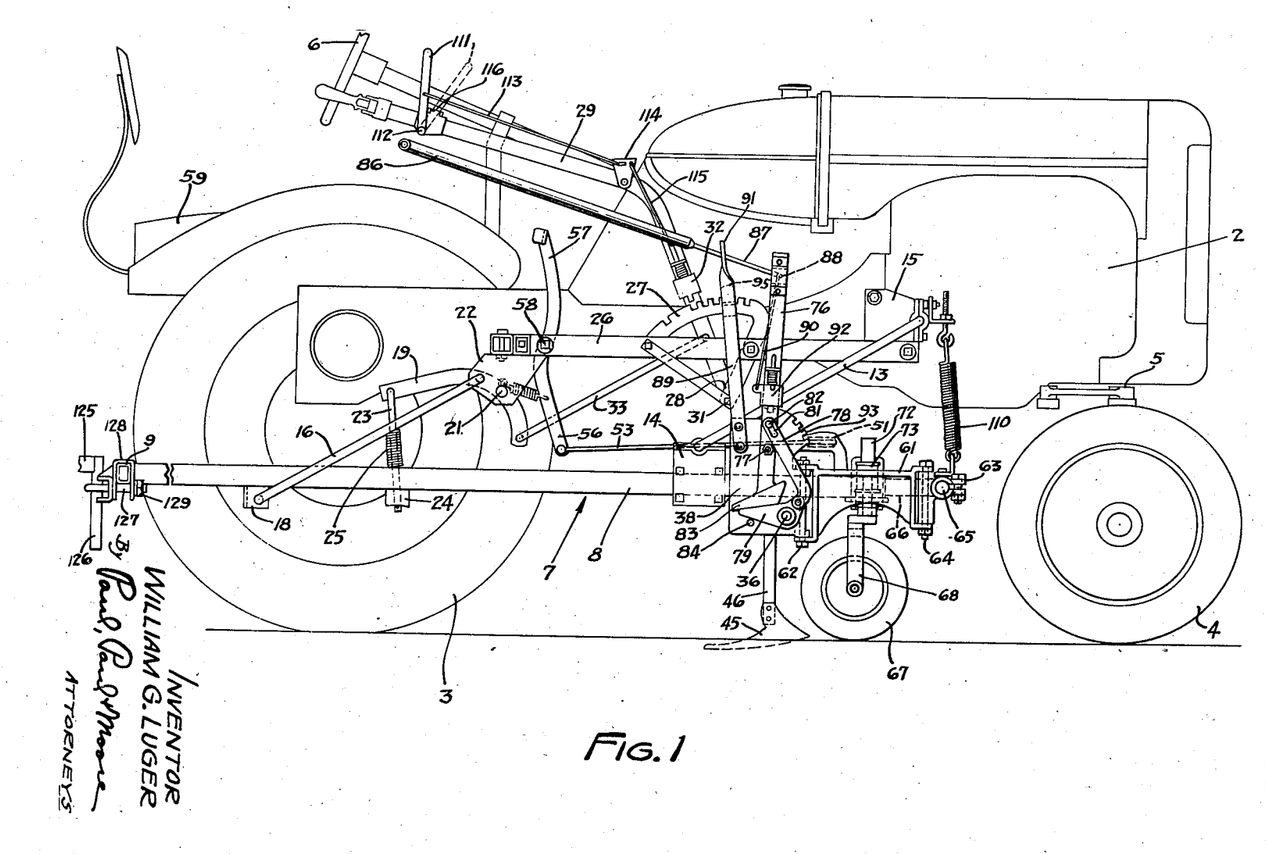
Figure 1 is a side elevation of a conventional tractor showing the attachment mounted thereon, and in operative position.

In the selected embodiment of the invention herein disclosed, there is illustrated in Figure 1, a conventional tractor comprising the usual body 2 mounted on suitable rear traction wheels 3 and front wheels 4. The front wheels are adapted to pivot about vertical pivots 5 by manipulation of a conventional steering wheel 6, shown in Figure 1.

Figure 2:
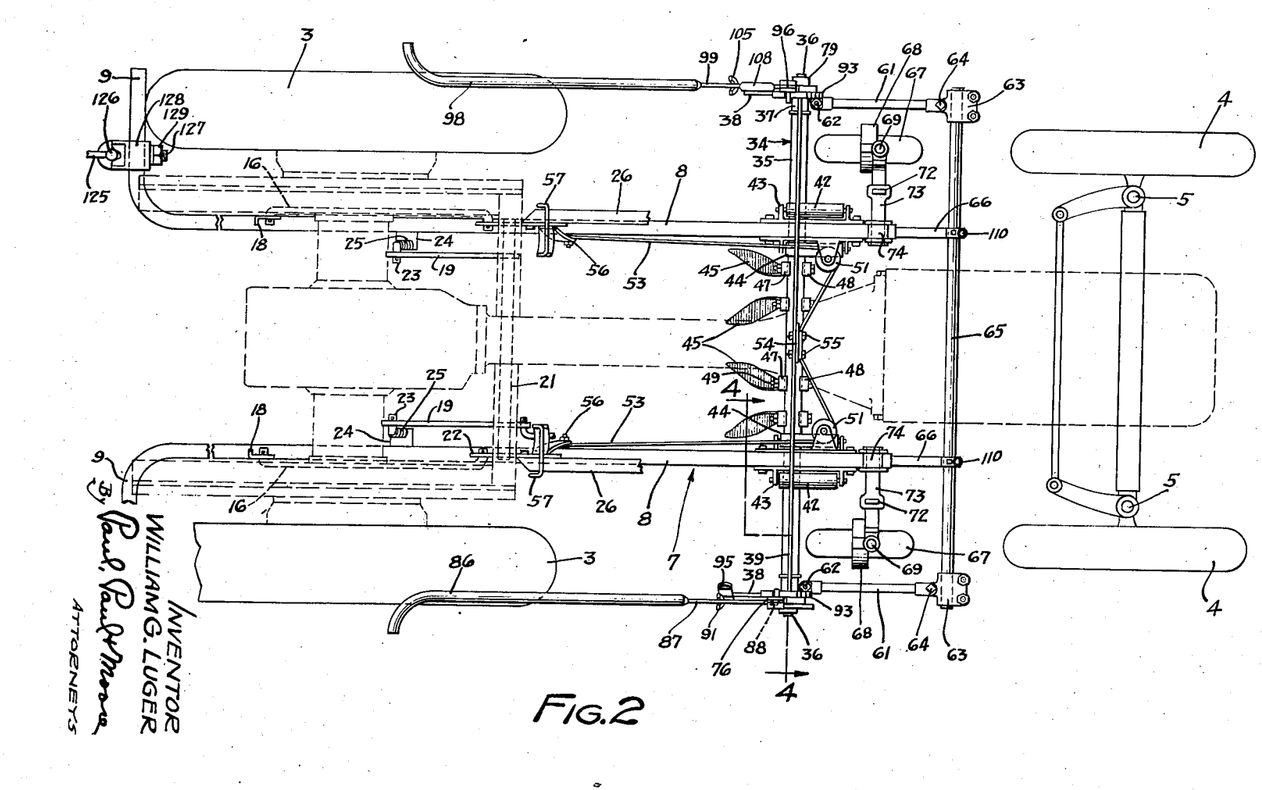
Figure 2 is a plan view of Figure 1 with some of the parts omitted.

The tractor herein disclosed, is shown provided with a vertically adjustable tool supporting frame, generally designated by numeral 7. The tool supporting frame is shown comprising side members 8, which are preferably disposed below the alined axes of the rear wheels 3, and have their rear end portions 9 turned outwardly, as best shown in Figure 2.

The forward end of the tool supporting frame 7 is operatively connected to the body of the tractor by suitable drag links 13, one such link being provided for each frame member 8. The drag links 13 have their rear end portions pivotally connected to their respective side frame members 8 by suitable brackets 14, and the forward ends of the links 13 are similarly connected to the body of the tractor by suitable bearing brackets 15. The ends of the drag links 13 are bent at right angles to the bodies of their respective links and are supported against lateral swinging movement by the bearing brackets 15. The links 13 are thus free to swing in vertical planes to permit up and down movement of the supporting frame 7, but are restrained against lateral swinging movement with respect to the tractor.

Similar drag links 16 operatively connect the rear end of the tool supporting frame to the tractor body. The forward ends of the rear drag links 16 are pivotally connected to brackets 22 secured to the tractor body, and the rear terminals thereof are pivotally connected to suitable brackets 18 secured to the side frame members 8 of the frame 7. By reference to Figure 1, it will be noted that the drag links 13 and 16 at each side of the tractor body are disposed in substantially parallel relation, whereby the tool supporting frame 7 is always retained in substantially parallel relation to the ground, regardless of its relative up and down movement.

A pair of lifting arms 19, one at each side of the tractor body, are secured to a cross shaft 21, mounted for rocking movement in the brackets 22. Connecting links 23 have their upper ends pivotally connected to the rear swingable ends of the arms 19 and their lower ends are slidably supported in guides 24, secured to the side members 8 of the tool supporting frame 7. Suitable compression springs 25 are mounted on the links 23, whereby a yieldable pressure may be exerted on the tool supporting frame 7, to hold the ground engaging tools which may be supported thereon, in the ground.

A beam 26 is provided at each side of the tractor body and has its end portions secured respectively to such means as the brackets 15 and 22, shown in Figure 1. A suitable quadrant 27 is secured to the beam 26 at the right hand side of the tractor body, and has a depending portion 28 to which one end of a suitable operating lever 29 is pivoted, as shown at 31. The lever 29 has a spring actuated latch member 32 adapted to engage one of a series of notches in the quadrant 27, thereby to retain the tool supporting frame 7 in adjusted position. A suitable connecting link 33 operatively connects the lever 29 with the forward end of the adjacent arm 19, as shown.

The supporting frame 7 and its operating mechanism above described, are more or less old in the art, and form no part of the present invention, except insofar as to provide a support therefor, but it is to be understood that other means may be provided for supporting the invention, without departing from the scope thereof. It is to be further understood that while I have herein shown this invention applied to a tractor of the four-wheeled type, it may be applied with equal results to tractors of the three-wheeled type, and others, where applicable.

The present invention is directed to a novel means for movably supporting one or more ground engaging tools on a tractor, whereby said tools may be accurately positioned with respect to one or more plant rows to be cultivated, and whereby the working depth of the tools in the ground may be accurately gauged, and also whereby the tools may be accurately guided along the row or rows, independently of the tractor, and, when necessary, may be quickly swung out of the ground to inoperative positions without the necessity of vertically adjusting the tool supporting frame 7.

Figures 4, 5:
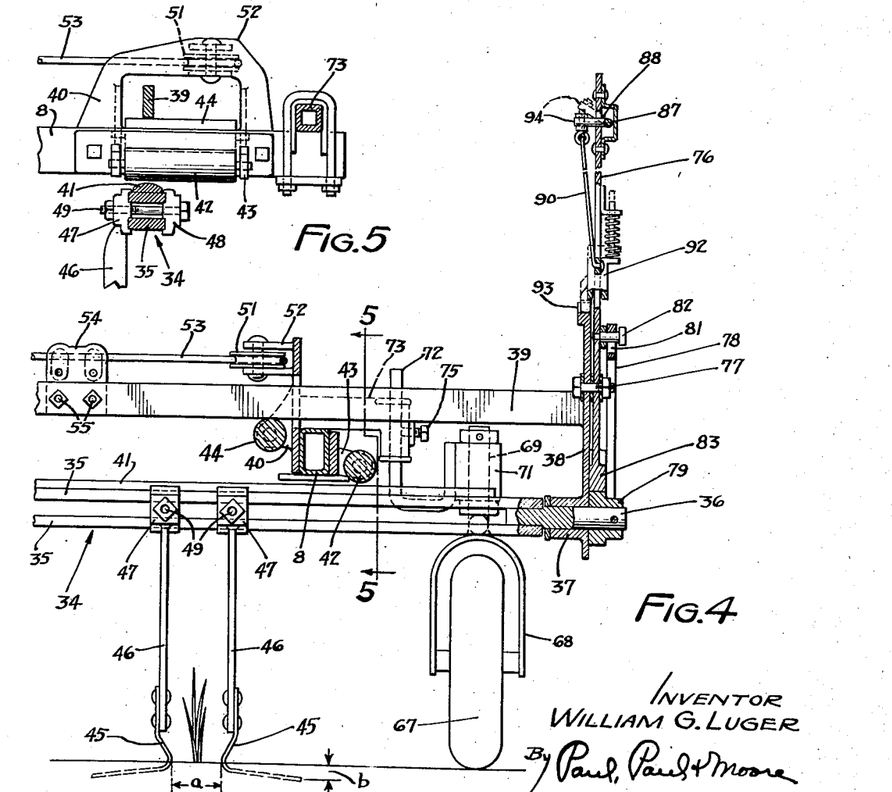
Figure 4 is an enlarged detail sectional view substantially on the line 4—4 of Figure 2.
Figure 5 is a detail sectional view on the line 5—5 of Figure 4.

As best shown in Figure 4, a tool supporting bar, generally designated by the numeral 34, is shown composed of a pair of spaced parallel bars 35, having their end portions suitably secured to oppositely disposed stub shafts 36, rotatively supported in suitable bearings 37 provided in the lower portions of suitable plates 38. These plates are fixedly secured to an upper spacing member or bar 39 by suitable means, not shown, as will be understood by reference to Figure 4. The spacing member 39 is disposed above the tool supporting bar 34 and retains the bearing plates 38 in spaced relation. The upper member 35 of the tool supporting bar 34 is shown provided with a rail 41, adapted to engage suitable rollers 42, mounted in brackets 43 secured to the side frame members 8 of the tool supporting frame 7, as best illustrated in Figure 4. Similar rollers 44 are mounted in brackets 40 secured to the inner sides of the side frame members 8 adapted to be engaged by the lower edge of the spacing member 39, and whereby the weight of the entire tool supporting bar 34 and its associated mechanisms, may be carried upon the rollers 44. The rollers 44 thus carry the weight of the entire tool supporting bar, and the rollers 42 resist upward movement thereof, when the ground engaging tools 45 engage an obstruction during the cultivating operation.

The rollers 42 and 44 cooperate to "floatingly" support the tool supporting bar 34 upon the frame 7, whereby it may readily be shifted laterally with respect to the tractor with a minimum of effort. The ground engaging tools 45 may be of conventional design, and are detachably secured to shanks 46 provided at their upper ends with suitable clamping elements 47 and 48, adapted to embrace the spaced members 35 of the tool supporting bar 34. The clamping elements 47 and 48 are adjustably secured to the tool supporting bar 34 by bolts 49, as clearly illustrated in Figure 5. By thus clampingly securing the shanks 46 to the tool supporting bar 34, the tools may readily be longitudinally adjusted on the bar 34, thereby to accurately space each pair of tools with respect to a given plant row, as indicated at *a* in Figure 4, and also whereby the spacing between pairs of tools may be varied to correspond to the spacing between rows to be cultivated, as will readily be understood by reference to Figures 3 and 4.

Sheaves 51 are shown mounted on the upper portions 52 of the brackets 40, as shown in Figure 4. Suitable chains or flexible elements 53 have running connections with the sheaves 51, and are secured to the intermediate portion of the upper spacing member 39 by a suitable clamping or securing device, generally designated by the numeral 54. The clamping device 54 may be secured to the member 39 by suitable bolts 55. The opposite ends of the chains or cables 53 are shown secured to the lower end portions 56 of a pair of foot pedals 57, shown pivotally mounted on the side beams 26 by pivots 58, as best shown in Figure 1.

Figure 3:
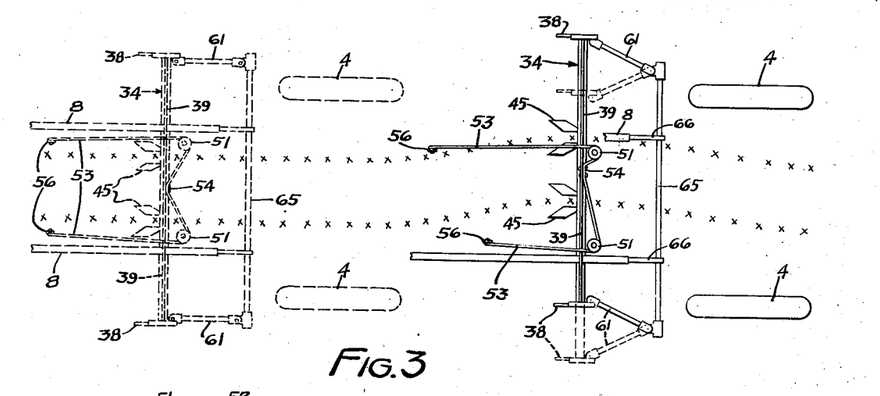
Figure 3 is a diagrammatic view showing in full and dotted lines, different positions of the tool supporting bar.

The pedals 57 are located convenient to the driver's seat 59, whereby the driver or operator of the tractor may readily manipulate the pedals 57, thereby to laterally shift the tool supporting bar 34 with respect to the traveling movement of the tractor, as clearly illustrated in Figure 3.

The transversely disposed tool supporting bar 34 is shown having its outer end portions connected to the rear ends of a pair of draft links 61, as shown at 62 in Figures 1 and 2. The forward ends of the links 61 are pivotally connected to members 63 by suitable pivots 64. The members 63 are secured to the outer ends of a stationary cross shaft or rod 65, having extensions 66 detachably securing it to the forward ends of the frame members 8 of the tool supporting frame 7. The extensions 66 are detachably secured to the frame members 8 by suitable means, not shown, whereby the cross shaft 65 may readily be detached from the tool supporting frame, when desired.

From the foregoing it will be noted the tool supporting bar 34 is thus operatively connected to the cross shaft 65 by the links 61, which permit the tool bar to be freely moved in a direction crosswise of the tractor by manipulation of the foot pedals 57, as clearly indicated by the full and dotted lines at the right hand end of Figure 3. Also by thus connecting the tool bar 34 to the cross shaft 65, the travel paths of the tools 45 will always be parallel to the plant rows, as will readily be understood by reference to Figures 2 and 3.

The rollers 42 and 44 are elongated as shown in Figure 2, to allow for the relative forward and rearward movement of the tool supporting bar 34, caused by the swinging movement of the draft links 61, when the bar is laterally shifted from side to side with respect to the tractor.

Another important feature of the invention resides in the provision of means for gauging the working depth of the tools in the ground, indicated at *b* in Figure 4, during the cultivating operation, and whereby the tools may be maintained at substantially a constant depth in the ground, regardless of irregularities or undulations in the ground surface.

The means provided for thus maintaining the tools at a uniform depth in the ground is shown consisting of a pair of gauge wheels or castors 67, each preferably comprising a forked bracket 68 having an upright spindle 69. The spindles 69 are rotatively mounted in suitable bearings 71 provided in offset shanks 72 mounted for vertical adjustment in brackets 73, shown secured to the forward ends of the side frame members 8 of the tool supporting frame 7 by suitable clamping members, as indicated at 74 in Figures 2 and 4. Suitable set screws 75 may be provided in the brackets 73 for securing the shanks in adjusted position, and whereby the working depth *b* of the tools may readily be varied to suit the requirements of the particular crop or plants being cultivated.

The vertical adjustment of the tools is important, in that certain crops may require very shallow cultivation, particularly in the early growing season, while other crops, or the same crop, may require relatively deeper cultivation, as the growing season progresses. From actual experience in the growing of commercial truck crops, I have found that the depth *b* of the tools in the ground may vary from one half inch to approximately three inches, depending upon the crop and the particular time of the growing season that the cultivating is performed.

The brackets 73 are preferably so secured to the forward ends of the frame members 8 that they may be relatively adjusted thereon to vary the spacing between the gauge wheels 67. In order that the gauge wheels may function to more accurately gauge the depth of the tools in the ground, they are preferably so spaced apart crosswise of the tractor as to travel in the tracks of the front wheels 4, whereby they will travel on a relatively firm footing, as will readily be understood. By reference to Figures 1 and 2, it will also be noted that the alined axes of the gauge wheels 67 are preferably spaced relatively close to the longitudinal axis of the tool supporting bar 34, whereby the working depth of the tools 45 in the ground may be more accurately gauged.

While I have herein shown the gauge wheels as being mounted on the forward ends of the frame members 8 of the tool supporting frame 7, it is to be understood that they may be otherwise mounted, if desired, without departing from the scope of the invention. It is also to be understood that the gauge wheels need not necessarily be in the form of castors as there is little tendency for said wheels to pivot about the axes of the spindles 72, when traveling along the plant rows. When the tractor reaches the ends of the plant rows, the cultivator tools are swung out of the ground, as will subsequently be described. The tool supporting frame 7 is then usually bodily elevated, by manipulation of the lever 29, whereby the gauge wheels 67 are moved out of contact with the ground, whereby they need not be in the form of castors during turning movement of the tractor.

Figure 6:
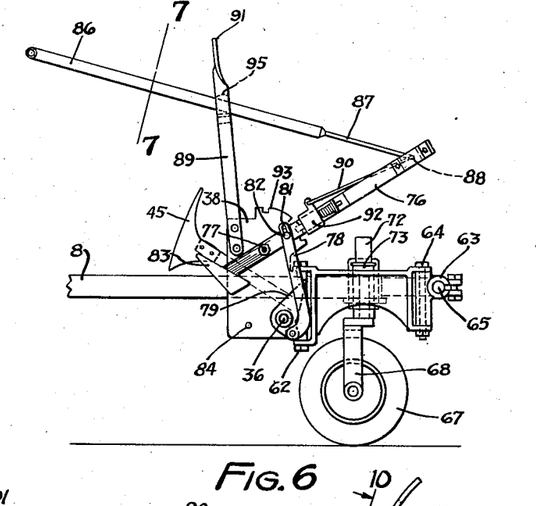
Figure 6 is a fragmentary view showing the means for rotating the tool supporting bar to swing the tools out of the ground, and also showing the means for locking said bar in operative position.

Another important feature of the invention resides in the provision of means for relatively rotating the tool supporting bar 34 to swing the tools 45 out of the ground to the position shown in Figure 6. To thus operate the tool supporting bar, a suitable lever 76 is mounted on a pivot 77 provided in the plate 38, at the right hand side of the tractor, as shown in Figure 1. This lever has one end of a link 78 operatively connected thereto above the pivot 77. The opposite end of the link 78 is pivotally connected to one end of a cam element 79 mounted upon and secured to the adjacent stub shaft 36 of the tool supporting bar 34, as shown in Figure 4. The upper end of the link 78 is shown provided with an elongated opening or slot 81, which receives the pivot pin 82 that operatively connects the link to the lever 76.

A suitable cam element or abutment member 83 is provided on the lower end of the lever 76 below the pivot 77, and is adapted to engage the cam element 79 and secure it in position against a stop pin 84, fixedly mounted in the plate 38. The cam elements 79 and 83 cooperate to provide means for locking the tool supporting bar 34 against relative rotation, when said bar is positioned with the tools 45 in the ground, as shown in Figure 1. By thus firmly locking the tool supporting bar, the tools are not likely to chatter when operated in the soil, and the locking elements also prevent the tools from accidently swinging out of the ground.

An operating member or extension handle 86 is shown provided with a reduced end portion 87 which is pivotally connected to the upper end of the lever 76, as shown at 88 in Figures 1, 2 and 4. A standard 89 is secured to the plate 38 and has a forked upper end 91 adapted to receive the reduced end portion 87 of the operating handle 86, when the latter is positioned as shown in Figure 1, as when the ground working tools 45 are in cultivating position. The standard 89 serves to support the extension handle 86 in a position convenient to the driver's seat when cultivating.

A spring actuated latch member, generally designated by the numeral 92, is provided on the lever 76 adapted to engage notches provided in a suitable quadrant 93 which may be secured to or made integral with the plate 38. The latch 92 has a rod or wire 90 operatively connecting it to the offset end portion 94 of the reduced end 87 of the handle 86, whereby when the operating handle 86 is relatively rotated, the offset end 94 of the handle may be moved between the full and dotted lines shown in Figure 4, thereby to move the latch member 92 out of or into engagement with the notches in the quadrant 93, depending upon the rotation of the handle 86.

In Figure 1, the lever 76 is shown positioned to lock the tool supporting bar 34 against rotation, as when the tools 45 are engaged with the ground. In Figure 6 the lever 76 is shown swung forwardly by forward movement of the operating handle 86 by the operator, whereby the locking elements 79 and 83 are moved out of locking engagement with one another, and the locking bar has been rotated to swing the tools 45 out of the ground and into inoperative positions. The slot 81 in the upper end of the link 78 permits the lever 76 to be partially oscillated before rotary movement is imparted to the tool supporting bar and cam element 79, thereby to permit the upper locking element 83 to be moved out of the swinging path of the lower element 79, before rotary movement is imparted thereto.

Figures 7, 8:
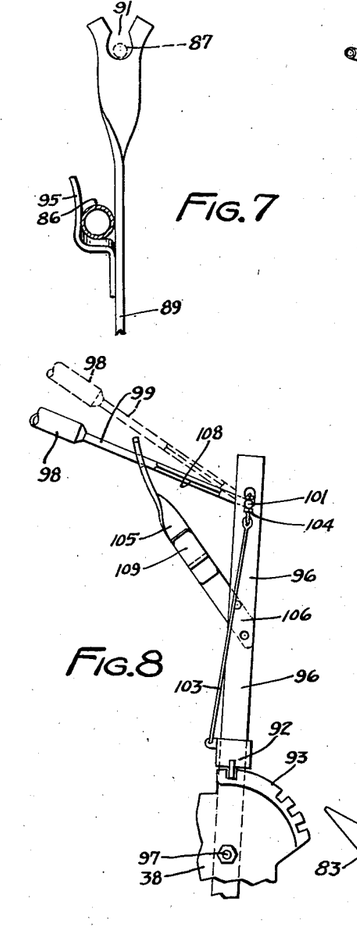
Figure 7 is a detail sectional view substantially on the line 7—7 of Figure 6.
Figure 8 is a fragmentary view showing one of the control levers for the locking means of the tool supporting bar.

When the lever 76 is positioned as shown in Figure 6, the extension handle 86 is preferably supported in a clip 95 provided on the standard 89, as clearly illustrated in Figures 6 and 7. It will thus be seen that the standard 89 serves to retain the operating handle 86 in position within convenient reach of the driver, regardless of the position of the lever 76. In order to positively eliminate any chattering of the tools when engaged with the ground, as a result of torsional strains being imparted to the tool supporting bar 34, said bar is preferably locked against rotation at both ends. A similar locking means is therefore provided at the opposite or left hand end of the tool supporting bar, as shown in Figures 2, 8, 9 and 10.

A similar lever 96 is pivoted at 97 to the plate 38 at the opposite end of the tool supporting bar 34 and is provided with a locking element 83, similar to the one shown on the lever 76, adapted to engage a cam element 79 secured to the adjacent stub shaft 36 of the tool supporting bar 34.

The lever 96 also has a spring actuated latch 92 adapted to engage a quadrant 93 similar to the one provided at the opposite end of the tool supporting bar. An extension handle 98 is shown having a reduced end portion 99 provided with an offset terminal 101 which is pivotally supported to the lever 96 as indicated at 102. A rod or wire 103 operatively connects the latch 92 with the offset end 101 of the operating handle 98, as shown at 104, whereby when the operating handle is relatively rotated, the latch 92 may be moved out of locking engagement with the quadrant 93, as shown in Figure 9.

Because of the extension handles 86 and 98 being spaced a considerable distance apart—in fact too far for the operator of the tractor to conveniently operate both handles at one time, means is provided in connection with the extension handle 98 whereby the latch 92 associated therewith may be locked in inoperative position, thereby to permit the operator to manipulate the handle 86 to rotate the tool supporting bar to swing the tools 45 out of the ground, as shown in Figure 6.

Figures 9, 10:
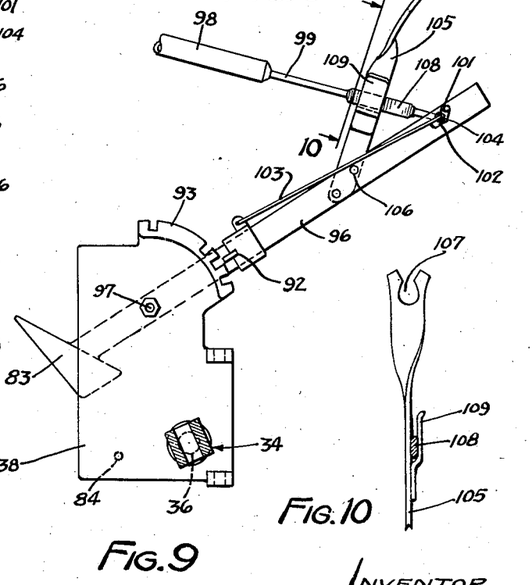
Figure 9 is a view showing the operating lever of Figure 8 in position to release the locking means.
Figure 10 is a detail sectional view substantially on the line 10—10 of Figure 9.

To thus lock the latch 92 of the lever 96 in inoperative position, a supporting member 105, is preferably fixedly secured to the lever 96, as shown at 106 in Figure 9. The upper end of the member 105 is forked, as shown at 107 in Figure 10, to receive the restricted portion 99 of the extension handle 98, whereby said handle is supported in a convenient position with respect to the driver's seat, when the lever 96 is in the position shown in Figure 8, as when locking the tool supporting bar in cultivating position.

The restricted portion 99 of the extension handle 98 has a flattened portion 108 adapted to be inserted behind a clip 109, secured to the supporting member or post 105, as shown in Figure 10. The plane of the flattened portion 108 of the handle 98 is angularly disposed with respect to the axis of the offset end portion 101 thereof, whereby when the flattened portion 108 is positioned in the clip 109, as shown in Figure 10, the offset end portion of the handle will be positioned to hold the latch member 92 out of engagement with the quadrant 93, as best shown in Figure 9.

Means is also provided whereby when the ground engaging tools are operatively engaged with the ground, as when cultivating, the latch 32 of the lifting handle 29 may be retained out of engagement with the quadrant 27, thereby to permit the gauge wheels 67 to travel in the tracks of the front wheels 4, and thereby carry substantially the entire weight of the tool supporting frame 7 and the parts connected therewith. Suitable springs 110 may be interposed between the brackets 15 and extensions 66, as shown in Figures 1 and 2, to relieve the gauge wheels 67 of a portion of the weight of the tool supporting frame 7.

To thus secure the latch member 32 in inoperative position, a small latch operating lever 111 is pivotally mounted on the lever 29 adjacent to its upper end, as indicated at 112 in Figure 1. The lever 111 has a rod or wire 113 connecting it with a member 114, shown pivoted on the intermediate portion of the main lever 29. A rod or wire 115 operatively connects the member 114 to the latch 32. A suitable spring clip or retaining member is provided on the main operating lever 29 adjacent to the latch operating lever 111, as indicated at 116 in Figure 1. This retaining member is adapted to secure the latch operating lever 111 in the full line position shown in Figure 1, whereby the latch member 32 is retained or locked in inoperative position, thereby to permit the main operating lever 29 to freely oscillate about its pivot 31, as a result of relative up and down movement of the tool supporting frame 7, when the latter is carried on the gauge wheels 67, as when cultivating.

If it is desired to exert a downward pressure on the tool supporting frame 7 to assist in holding the tools in the ground, the latch operating lever 111 is released from the retaining member 116 to free the latch 32. The main operating lever 29 may then be swung forwardly by the operator, and secured in such position by the latch 32 engaging one of the notches in the quadrant 27. When the main operating lever 29 is thus positioned, the arms 19 will exert a downward pressure on the side members 8 of the tool supporting frame 7, through the springs 25, whereby a yielding downward pressure is exerted on the tool supporting frame, as will readily be understood.

During the cultivating operation, the latch member 32 is usually retained in inoperative position, as shown in Figure 1, whereby the major portion of the weight of the tool supporting frame 7 and the parts thereof, will be carried upon the gauge wheels 67. The gauge wheels will retain a relatively fixed spacing between the ground surface and the tool supporting frame 7 or the tool supporting bar 34 whereby the penetration of the tools 45 into the ground will be substantially uniform the entire length of the row, regardless of ground undulations.

By thus carrying the major portion of the weight of the tool supporting frame on the gauge wheels 67, the tools 45 cannot dig deeply into the ground or become disengaged therewith, as a result of the front wheels of the tractor passing through a low place in the ground or over a ridge.

In addition to the ground engaging tools 45 mounted on the transversely movable tool supporting bar 34 disposed intermediately of the tractor body, provision is made at the rear of the tractor body for supporting a plurality of auxiliary ground engaging tools 117 and 118. The side tools 117 are preferably aligned with the rear wheels 3 of the tractor, whereby they will loosen the soil which has become packed by the wheels of the tractor.

Figure 12:
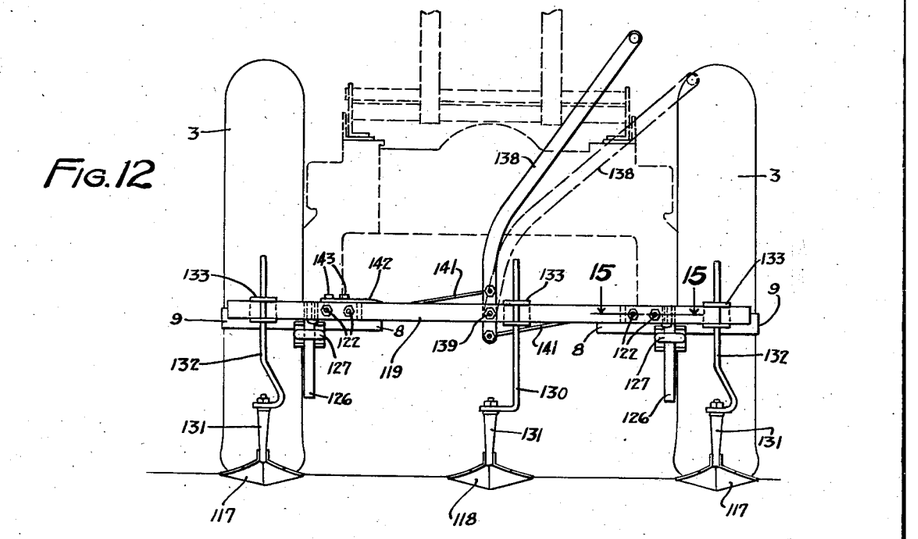
Figure 12 is a rear view of Figure 11.

The center tool 118 is positioned to cultivate a strip between plant rows which may not be cultivated by the tools 45. One, two or more such tools may be provided, depending upon the number of rows being cultivated at one time. In Figure 3 the tractor wheels are shown straddling two plant rows, in which case but one tool 118 is required, as shown in Figure 12. In some cases, however, three or more rows may be straddled by the tractor wheels, whereby two or more tools 118 may be required, as will be understood.

Figure 11:
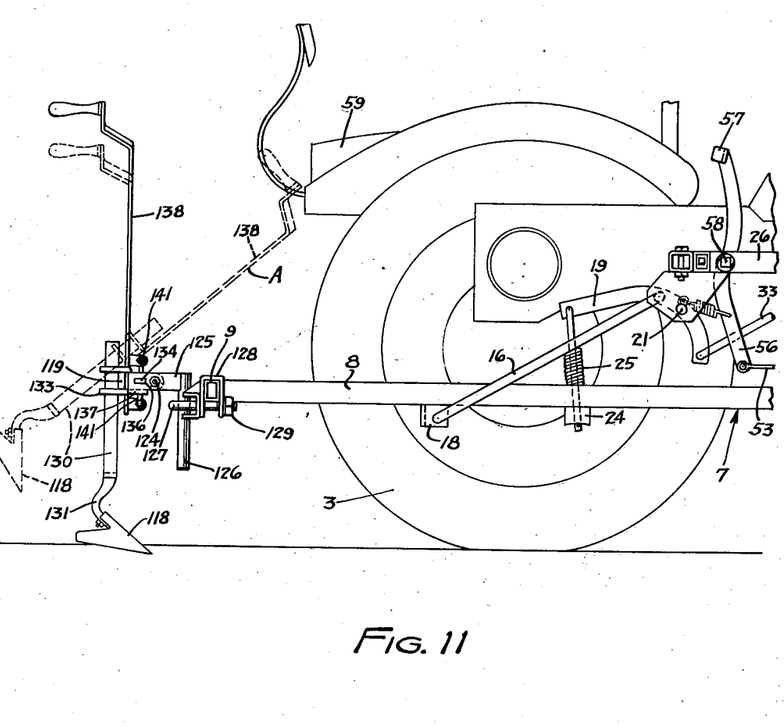
Figure 11 is a side elevation of the rear portion of the tractor showing a plurality of additional tools mounted on the rear end of the tool supporting frame.

The tools 117 and 118 are shown mounted upon a transversely disposed bar 119 having U-shaped brackets 121 secured thereto by such means as bolts 122. The outer leg 123 of each bracket 121 is preferably pivotally connected by a bolt 124 to a laterally extending wing 125 of an upright shank 126, as best shown in Figure 11. Two such shanks are utilized, and they are adjustably secured to the outwardly bent end portions 9 of the side frame members 6 of the tool supporting frame 7, by suitable means such as eye bolts 127 which embrace the shanks 126. The eye bolts 127 are mounted in suitable clamping brackets 128, supported on the outwardly bent end portions 9 of the tool supporting frame 7, and are firmly secured thereto, when the nuts 129 of the eye bolts 127 are tightened to secure the shanks 126 in place, as will readily be understood by reference to Figure 11.

The side tools 117 have upright portions or shanks 131, as shown in Figure 12, which are secured to the lower ends of suitable supporting bars 132, adjustably secured to the transverse bar 119 by suitable clamping brackets, generally designated by the numeral 133. The clamping brackets 133 permit the spacing between said tools to be varied as will readily be understood.

The center tool 118 has its shank 131 secured to a similar attaching bar 130 which, like the bars 132 of the outer tools 117, is adjustably secured to the transverse bar 119 by a clamping bracket 133. The clamping brackets are so constructed that the tools 117 and 118 may be adjusted lengthwise of the bar 119, and also whereby the tool shanks 132 and 134 may be vertically adjusted on the bar 119 to vary the penetration of the tools into the ground.

Figures 13, 14:
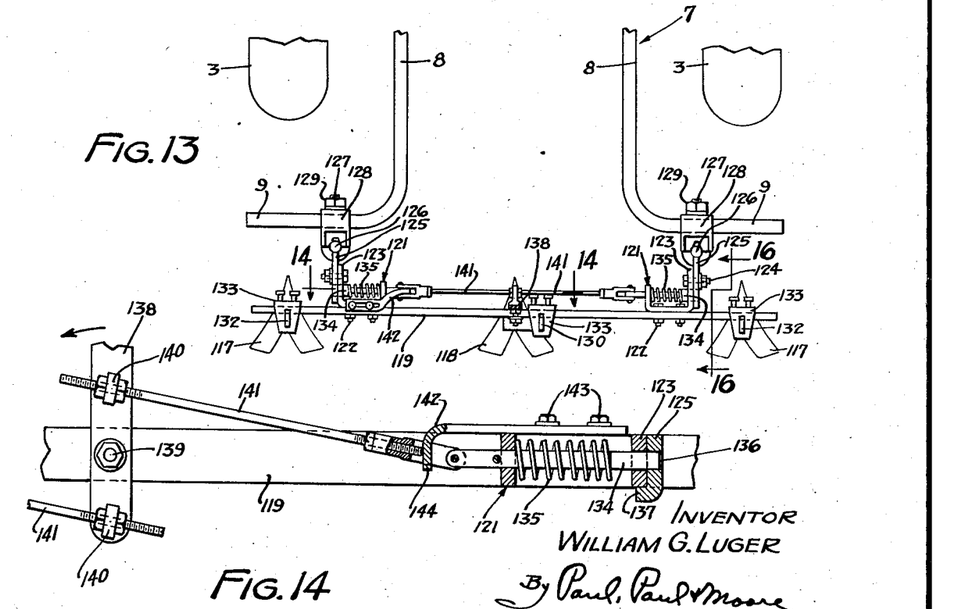
Figure 13 is a plan view of Figure 12.
Figure 14 is an enlarged detail sectional view on the line 14—14 of Figure 13, showing the locking means for the rear tool supporting bar in locking position.
Figure 15:
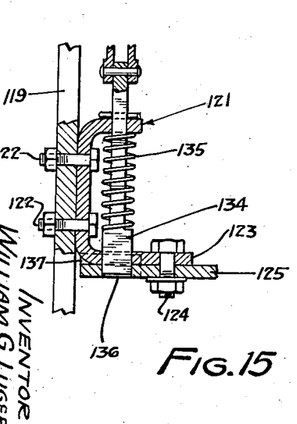
Figure 15 is an enlarged detail sectional view on the line 15—15 of Figure 12, showing the locking means for the rear tool supporting bar, in operative position.

Means is provided whereby the rear tools 117 and 118 may be swung out of the ground into inoperative positions, as indicated by the dotted lines in Figure 11, and resides in the pivotal mounting of the U-shaped brackets 121 upon the lateral wings 125 of the shanks 126. To secure the tools 117 and 118 in operative or cultivating position, as shown in full lines in Figure 11, suitable locking bolts 134 are slidably mounted in the U-shaped brackets 121, as clearly shown in Figures 14 and 15. A suitable spring 135 is coiled about each locking bolt 134 and constantly urges said bolts in directions to move the bolts into locking engagement with the offset heads 125 of the shanks 126, as best shown in Figures 14 and 15. Each head 125 is shown provided with an aperture 136 which is aligned with its complemental locking bolt 134, whereby when the U-shaped brackets 121 are in the horizontal positions, shown in Figure 11, the enlarged terminals or heads of the locking bolts 134 may enter the apertures 136, and thereby lock the brackets 121 against relative pivotal movement about the aligned axes of the pivot bolts 124. An abutment shoulder 137 is provided on each lateral wing 125 adapted to be engaged by the outer legs 123 of the U-shaped brackets 121, when the latter are in horizontal positions, whereby the locking bolts 134 will be aligned with the apertures 136 provided in the wings 125, as will readily be understood by reference to Figures 15 and 16.

Means is provided for actuating the locking bolts 134, and is shown comprising a lever 138 mounted on a pivot 139 provided on the transverse bar 119. Connecting rods 141 connect the locking bolts 134 with the lever 138 above and below the pivot bolt 139, as shown at 140 in Figure 14, whereby when the lever is moved from the full to the dotted line position, shown in Figure 12, the two locking bolts are withdrawn from the apertures 136, thereby to release the U-shaped brackets 121 from the lateral wings 125 of the shanks 126, so that the tool bar 119 may be swung upwardly from the position shown in Figure 11, to that shown in Figure 16. When the bar 119 is thus actuated, the ground engaging tools 117 and 118 are swung rearwardly and upwardly out of the ground. The swinging movement of the tool bar 119 is controlled by the lever 138, as will be understood by reference to Figures 11 and 12.

A stop member 142 is preferably adjustably secured to one of the U-shaped brackets 121 by suitable bolts 143 and serves to limit the traveling movement of the locking bolts 134. The stop member 142 is shown having downwardly bent end portion 144 which may be received in the forked end of one of the connecting rods 141, as clearly illustrated in Figure 14, whereby the movement of the locking bolts will be limited as will be readily understood.

In the operation of the rear ground engaging tools 117 and 118, the lever 138 is vertically positioned, as shown in Figure 11, whereby the U-shaped brackets 121 will be seated against their respective abutment shoulders 137, as best shown in Figure 14. When the brackets 121 are thus positioned, the locking bolts 134 may readily enter the apertures 136 in the wings 125, and thereby lock the tool bar 119 against relative rotation about the axes of the pivot bolts 124.

Figure 16:
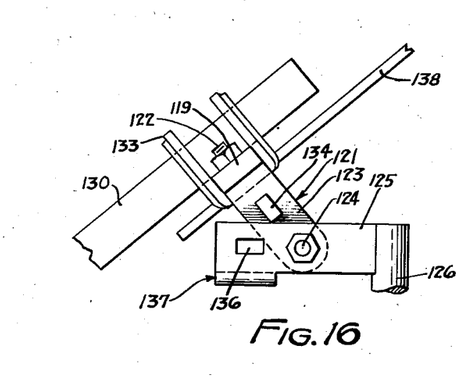
Figure 16 is an enlarged detail sectional view on the line 16—16 of Figure 13 showing the rear tool supporting bar tilted upwardly to support the tools out of the ground.

When it is desired to throw or lift the ground engaging tools 117 and 118 out of the ground, the operator seated on the tractor simply grasps the upper end of the lever 138 and moves it from the full to the dotted line position shown in Figure 12, whereupon the locking bolts 134 are withdrawn from the apertures 136. The operator then pulls the lever 138 forwardly from the full to the dotted line position shown at A in Figure 11, whereupon the ground engaging tools are swung out of the ground as indicated in dotted lines in Figure 11. The tool bar 119 may be locked in inoperative position, as shown in Figure 16, by returning the lever 138 to the full line position shown in Figure 12, while the lever is in the forward position, shown at A in Figure 11. When thus positioned, the locking bolts 134 are projected over the wings 125, as shown in Figure 16, whereby the U-shaped brackets 121 cannot return to their horizontal operative positions.

A feature of the invention resides in the unique construction of the supporting means for the rear ground engaging tools 117 and 118, whereby these tools, including their supporting and operating means, may readily be removed or detached from the tractor as a unit, when they are no longer required. In other words the entire tool supporting means provided at the rear of the tractor may be made in the form of a separate attachment, which may quickly and conveniently be mounted upon the tractor or removed therefrom.

To remove the tool bar 119 and its associated parts from the tractor, it is only necessary to loosen the nuts 129 of the shanks 126, after which the entire unit may be removed from the side frame members 8 of the tractor, as will readily be understood by reference to Figure 11. This is a highly desirable feature, as it permits the tractor to be utilized for a great many purposes around the premises, such as plowing, hauling, etc.

The attachment supported at the rear of the tractor, when used in combination with the ground engaging tools 45 supported on the transversely movable tool supporting bar 34, makes it possible to completely cultivate the entire strip of soil over which the tractor may travel, it being understood that the tools 45 are positioned to cultivate the soil in close proximity to the plants in each row, whereas the side tools 117 at the rear of the tractor are positioned to loosen the soil packed by the rear wheels 3. The center tool 118 is positioned to cultivate the strip of soil between adjacent rows, it being understood that the tools 45 may not always cultivate the entire strip of soil between two adjacent rows.

In the drawings, I have shown the tool supporting bar 34 provided with means for locking it against rotation at both ends. In some instances, however, it may be sufficient to thus secure it at one end only, particularly if the bar is relatively short. Other means than those shown may also be utilized for operating the tool bar 34, without departing from the scope of the invention, provided such other means permits free lateral shifting and partial rotation of the tool bar. The same applies to the mounting of the rear tool bar 119 upon the rear end portions 9 of the side frame members 8 of the tool supporting frame 7, as obviously the tool bar 119 may be otherwise supported on the frame 7, than as shown in the drawings, and substantially the same results obtained.

The novel cultivator attachment herein disclosed has been found extremely practical and efficient for cultivating commercial truck crops because of the accuracy with which the tools thereof may be guided along the plant row or rows independently of the movement of the tractor. By mounting the tool supporting bar upon the anti-friction rollers 42 and 44, the tool supporting bar may readily and conveniently be shifted from side to side, as indicated in Figure 3, by the simple manipulation of the foot pedals 57 by an operator seated on the tractor. The unique construction of the operating parts of the tool supporting bar 34 are such that very little effort is required of the operator to manipulate the pedals, whereby the operator is not likely to become fatigued, even when cultivating for long periods at a time. I have found that because of the tool supporting bar 34 being so readily shiftable by manipulation of the foot pedals 57, the tools 45 of each pair of tools may be spaced relatively close together, as indicated at a in Figure 4, whereby hand weeding in the row is reduced to minimum, with a resultant saving in manual labor.

Because of the attachment being supported substantially entirely upon the gauge wheels 67, the cultivator tools may be adjusted to cause them to enter the soil to the desired depth. It is well known that some crops require deeper cultivation than others, and the novel attachment herein disclosed readily lends itself for all such cultivation.

Also because of the unique mounting of the tool supporting bar 34 on its supporting frame 7, the tools for each row may be spaced relatively closer together than is possible with conventional cultivator tools, whereby the un-cultivated strip remaining in the row will be very narrow, as compared with the relatively wider strips which must be left when using conventional cultivator attachments. This means a considerable saving in manual labor, as the un-cultivated strips left between adjacent rows must be hand weeded, and the narrower this strip can be made without danger of the cultivator tools damaging or uprooting the plants, the greater the saving in manual labor. This is of utmost importance in times like these when labor is at a premium.

The attachment is so constructed that it provides maximum overhead clearance for the plants with minimum height tractor wheels, whereby the attachment may be used for cultivating plants until they attain considerable growth. The attachment is also so constructed and arranged that it may readily and quickly be completely detached from the tractor when desired, to permit the tractor to be used for various other farm purposes such as hauling or plowing.

By mounting the forward group of ground engaging tools 45 and the rear group of tools 117 and 118, as herein shown and described, it will be noted that said groups of tools may be operated independently of each other, or simultaneously, as may be desired. In some instances it may be found desirable to use only the forward tools 45, in which case the rear group of tools may be dispensed with, either by completely removing them from the tractor, or by swinging them in to inoperative positions, as indicated in dotted lines in Figure 11. When the rear tools are utilized in conjunction with the forward tools 45, and the operator reaches the ends of the rows in one direction of travel, the front tools may be swung out of engagement with the ground by manipulation of the extension handle 86 to the position shown in Figure 7, without moving the rear tools 117 and 118 out of the ground. As the tractor moves forwardly and the rear tools subsequently reach the ends of the rows being cultivated, they are similarly thrown out of the ground by manipulation of the lever 138, as indicated in Figure 11. When all of the tools are thus swung out of the ground into inoperative positions, well above the ground surface, the operator may turn the tractor around into alignment with the next rows to be cultivated on the return trip. If the ground is not too hard, he may lower the front tools 45 into engagement with the ground without relatively adjusting the position of the tool supporting frame 7, and as the tractor continues forwardly, the rear tools are swung into engagement with the ground when they reach a position at the end of the rows.

In some instances, it may be found more desirable to slightly elevate the tool supporting frame 7 by manipulation of the lever 29 sufficiently to cause the bottoms of the tools to clear the ground surface when the tools reach the ends of the rows, after which the tools may be swung into inoperative positions by manipulation of the extension handle 86 and the rear lever 138, as hereinbefore stated. When the supporting frame is thus slightly elevated, the operator, after having turned the tractor around at the ends of the rows to start the return trip, preferably brings the tractor to a stop when the front tool supporting bar 34 is substantially in alignment with the ends of the rows, or slightly before it reaches the ends of the rows. The tools may then be lowered into operative positions, as shown in full lines in Figures 1 and 11, after which the operator lowers the tool supporting frame 7 until the gauge wheels 67 engage the ground. In some instances the tool supporting frame may be temporarily supported upon the tools 45, if the ground is slightly hard, but as soon as the tractor commences its forward movement, they will readily penetrate into the soil until the gauge wheels engage the ground and thereby gauge the working depth of the tools, as hereinbefore stated.

It will also be noted that by mounting the tool supporting bar 34 for rotary movement as herein set forth, a maximum clearance is obtained above the plants at all times, which is a highly desirable feature in that it may permit cultivation of the crop through a greater portion of the season, particularly some crops which may attain considerable height. Also as a result of the tool bar 34 being mounted for rotary adjustment, greater clearance is provided under the tractor when the tools are in inoperative positions, because when the tools 45 are swung upwardly to the position shown in Figure 6, and the tool supporting frame 7 is elevated by manipulation of the lever 29, the tool supporting bar and the tools will be positioned a considerable distance above the ground, whereby the parts of the cultivator attachment are not likely to encounter obstructions over which the tractor may pass.

The lateral shifting of the tool supporting bar 34 also makes it possible for the operator to cultivate crops planted on a hillside, because even though the tractor may have a tendency to slide slightly toward the downhill side, the operator may accurately guide the tools 45 along the plant rows by manipulation of foot pedals 57, whereby there is little danger of the plants being damaged or uprooted, even when traveling over comparatively rough ground. Also should the wheels' on one side of the tractor pass over or into a dead furrow, it may have a tendency to cause the tractor to slightly shift its course in a lateral direction. Such shifting of the tractor from its true course will not affect the travel of the tools 45, as they are controlled by the driver from the driver's seat, independently of the traveling movement of the tractor.

In the accompanying drawings, I have shown the tool supporting bar 34 and the operating means therefor mounted upon and supported by the tool supporting frame 7 of the tractor. It is to be understood that the tool supporting bar and its operating means, such as the levers 76 and 96, may be otherwise supported, if desired, provided the desired results are obtained.

It will be apparent to those skilled in the art that I have accomplished at least the principal objects of my invention, and it will also be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. The combination with a tractor comprising a body having front and rear supporting wheels, a driver's seat, and means operable from the driver's seat to control the traveling movement of the tractor, of a cultivator attachment comprising a supporting frame disposed beneath the tractor body, means operatively connecting said frame to the tractor body whereby the frame is adapted for vertical movement relative to the tractor body, a tool supporting bar carried on said frame having its longitudinal axis disposed transversely of the tractor body, ground engaging tools secured to the tool supporting bar, and means operable from the driver's seat to laterally shift the tool supporting bar on the supporting frame, independently of the traveling movement of the tractor, thereby to accurately guide the ground engaging tools along a plant row, said means comprising interconnected foot pedals operable in opposite directions to laterally shift the position of the tool supporting bar thereby to facilitate guiding the tools along the plant row.

2. The combination with a tractor comprising a body having front and rear supporting wheels, a driver's seat, and means operable from the driver's seat to control the traveling movement of the tractor, of a cultivator attachment comprising an implement supporting bar, ground engaging tools mounted on said bar, means for movably mounting the supporting bar on the tractor body transversely thereof, means operable from the driver's seat to laterally shift the implement supporting bar with respect to the tractor body, whereby the ground engaging tools may be accurately guided along a plant row, independently of the traveling movement of the tractor, and means for relatively rotating the implement supporting bar to move the tools out of the ground.

3. The combination with a tractor comprising a body having front and rear supporting wheels, a driver's seat, and means operable from the driver's seat to control the traveling movement of the tractor, of a cultivator attachment comprising a supporting structure mounted beneath the tractor body, means operatively connecting said supporting structure to the tractor body whereby it is adapted for vertical movement relative thereto, a tool supporting bar, anti-friction means for mounting the tool supporting bar on the supporting structure and whereby the tool bar may be freely shifted in a direction crosswise of the tractor body, ground engaging tools on the tool supporting bar, and foot pedals convenient to the driver's seat whereby the driver may readily laterally shift the tool supporting bar, with respect to the tractor body, thereby to accurately guide the tools thereof along a plant row, independently of the traveling movement of the tractor, said foot pedals being mounted for pivotal movement and each having an operative connection with the tool supporting bar whereby when one pedal is thrust forwardly, the tool supporting bar is laterally moved in one direction and when the other pedal is thrust forwardly the tool supporting bar is shifted in the opposite direction.

4. The combination with a tractor comprising a body having front and rear supporting wheels, a driver's seat, and means operable from the driver's seat to control the traveling movement of the tractor, of a cultivator attachment comprising a supporting frame disposed beneath the tractor body, means operatively connecting said supporting frame to the tractor body whereby it is adapted for vertical movement independent of the tractor body, a tool supporting bar carried by the supporting frame and adapted for lengthwise movement thereon in a direction crosswise of the tractor body, a plurality of ground engaging tools secured to said supporting bar, means operable from the driver's seat to laterally shift the tool supporting bar, thereby to accurately guide the tools thereof along a plant row, and means whereby the tool supporting bar may be relatively rotated to move the ground engaging tools out of the ground.

5. The combination with a tractor comprising a body having front and rear supporting wheels, a driver's seat, and means operable from the driver's seat to control the traveling movement of the tractor, of a cultivator attachment comprising a supporting frame disposed beneath the tractor body, means operatively connecting said supporting frame to the tractor body whereby it is adapted for vertical movement independently of the tractor body, a tool supporting bar carried by said supporting frame and adapted for longitudinal movement thereon in a direction crosswise of the tractor body, a plurality of ground engaging tools secured to said supporting bar, means operable from the driver's seat to laterally shift said tool supporting bar with respect to the tractor body, thereby to accurately guide the tools thereof along a plant row, means for relatively rotating the tool supporting bar to move the ground engaging tools out of the ground, and means for locking the tool supporting bar against relative rotation but permitting free lateral movement thereof.

6. The combination with a tractor comprising a body having front and rear supporting wheels, a driver's seat, and means operable from the driver's seat to control the traveling movement of the tractor, of a cultivator attachment comprising a supporting structure mounted beneath the tractor body between the front and rear wheels thereof, means operatively connecting said supporting frame to the tractor body whereby it is adapted for vertical movement relative thereto, a tool supporting bar carried by said supporting structure and mounted for longitudinal movement thereon crosswise of the tractor body, ground engaging tools carried by the tool supporting bar, foot pedals operatively connected with said tool supporting bar and whereby the operator of the tractor may freely laterally shift the tool bar with respect to the tractor body to accurately guide the tools thereon along a plant row independently of the traveling movement of the tractor, a control lever operatively connected to the tool supporting bar whereby said bar may be operated to move the tools out of the ground, and an extension handle having one end pivotally connected to said lever and its opposite end positioned adjacent to the driver's seat whereby the operator may conveniently operate said lever.

7. A cultivator attachment for a power propelled vehicle comprising a supporting frame, means for operatively connecting said frame to the power vehicle, a tool supporting bar mounted for lengthwise movement on said frame in a direction crosswise of the vehicle, ground engaging tools carried by the tool supporting bar, manually operable means for laterally shifting the tool supporting bar on the frame whereby the ground engaging tools secured thereto may be accurately guided along a plant row independently of the traveling movement of the vehicle, gauge wheels for controlling the operating depth of the tools in the ground, and means whereby the tool supporting bar may be operated to move the ground engaging tools out of the ground.

8. A cultivator attachment for a power propelled vehicle comprising a supporting frame, means for operatively connecting said frame to the power vehicle, a tool supporting bar mounted for lengthwise movement on said frame in a direction crosswise of the vehicle, ground engaging tools carried by the tool supporting bar, foot pedals for laterally shifting the tool supporting bar on the frame and whereby the ground engaging tools secured thereto may be accurately guided along a plant row independently of the traveling movement of the vehicle, gauge wheels for controlling the operating depth of the tools in the ground, means whereby the tool supporting bar may be relatively rotated in said frame to move the ground engaging tools out of the ground, and cam means for locking the tool supporting bar against relative rotation, when the tools are engaged with the ground, thereby to prevent the tools from chattering and from accidently moving out of the ground.

9. A cultivator attachment for a power propelled vehicle comprising a supporting frame, means for operatively connecting said frame to the power vehicle, a tool supporting bar mounted for lengthwise movement on said frame in a direction crosswise of the vehicle, ground engaging tools adjustably secured to said bar, foot pedals for laterally shifting the tool supporting bar on the frame whereby the ground engaging tools may be accurately guided along a plant row, gauge wheels for controlling the operating depth of the tools in the ground, means whereby the tool supporting bar may be relatively rotated in said frame to move the ground engaging tools out of the ground, a locking device at each end of the tool supporting bar for locking it against relative rotation, when the tools are engaged with the ground, thereby to prevent the tools from chattering and from accidently moving out of the ground, a plurality of auxiliary ground engaging tools mounted on said frame rearwardly of said first mentioned tools, and means adjacent to the driver's seat for controlling the operation of the auxiliary tools.

10. A cultivator attachment for a power propelled vehicle comprising a supporting frame, means for operatively connecting said frame to the power vehicle, a tool supporting bar mounted for lengthwise movement on said frame in a direction crosswise of the vehicle, ground engaging tools adjustably secured to said bar, foot pedals for laterally shifting the tool supporting bar on the frame whereby the ground engaging tools secured thereto may be accurately guided along a plant row, gauge wheels for controlling the operating depth of the tools in the ground, means whereby the tool supporting bar may be relatively rotated in said frame to move the ground engaging tools out of the ground, a locking device at each end of the tool supporting bar for locking it against relative rotation, when the tools are engaged with the ground, thereby to prevent the tools from chattering and from accidently moving out of the ground, a second tool supporting bar mounted for pivoted movement on the supporting frame rearwardly of said first mentioned tool bar and having a plurality of auxiliary ground engaging tools adjustably secured thereto, an operating lever for said rear tool bar whereby the latter may be operated from the driver's seat to move the ground engaging tools thereof into or out of the ground, and means associated with said lever whereby the rear tool supporting bar may be locked in operative or inoperative position.

11. The combination with a tractor comprising a body having front and rear supporting wheels, a driver's seat and means operable from the driver's seat to control the traveling movement of the tractor, of a tool supporting bar having ground engaging tools mounted thereon, a supporting structure for the tool supporting bar, means on said supporting structure whereby the tool bar may be laterally shifted with respect to the tractor body to guide the ground engaging tools secured thereto along a plant row independently of the traveling movement of the tractor, means rotatively supporting said tool supporting bar, a lever secured to one end of said bar and having means for locking the tool bar against rotation when in either operative or inoperative position, a complemental locking device at the opposite end of the tool bar whereby said bar may be locked in operative position at both ends, thereby to prevent chattering of the tools when engaged with the ground, and means operable from the driver's seat to manipulate said locking devices and to relatively rotate the tool bar.

12. The combination with a tractor comprising a body having front and rear supporting wheels, a driver's seat, and means operable from the driver's seat to control the traveling movement of the tractor, of a tool supporting bar disposed beneath the tractor body crosswise thereof, a plurality of ground engaging tools secured to said bar, means rotatively supporting said bar whereby it may be rotated to swing the tools into operative or inoperative positions, mechanism for laterally shifting the tool supporting bar comprising a pair of foot pedals located convenient to the driver's seat, a locking device at each end of the tool bar whereby it may be securely locked in operative position, each locking device comprising a lever having means for securing it in adjusted position, an extension handle, each having one end pivotally connected to one of said levers and having their opposite ends positioned convenient to the driver's seat, means associated with said extension handles for supporting them convenient to the driver's seat, regardless of the position of their respective levers, means operatively connecting one of said levers with the tool bar whereby said bar may be rotated by oscillation of said lever, and means whereby the other of said levers may be supported in unlocked position to permit relative rotation of the tool supporting bar by manipulation of one of the extension handles.

13. The combination with a tractor comprising a body having front and rear supporting wheels, a driver's seat and means operable from the driver's seat to control the traveling movement of the tractor, of a cultivator attachment operatively connected to said tractor and comprising a tool supporting bar mounted beneath the tractor body between the front and rear supporting wheels thereof, a plurality of ground engaging tools adjustably secured to the tool supporting bar, a pair of foot pedals located convenient to the driver's seat and having operable connections with the tool bar whereby manipulation of said foot pedal will laterally shift the tool bar to accurately guide the tools thereof along a plant row, means adjacent to the driver's seat for vertically adjusting the tool bar with respect to the ground, means for locking the tool bar against relative rotation, comprising a pivoted lever, a link operatively connecting said lever to the tool bar whereby when the lever is manipulated to operate said locking device, rotary movement is imparted to the tool bar to swing the tools thereof into or out of the ground, and an extension handle for said lever located adjacent to the driver's seat.

14. The combination with a tractor comprising a body having front and rear supporting wheels, a driver's seat, and means operable from the driver's seat to control the traveling movement of the tractor, of a cultivator attachment comprising a supporting frame having a plurality of ground engaging tools mounted thereon beneath the tractor body, a tool supporting bar mounted for pivotal movement on said supporting frame rearwardly of the tractor body and having auxiliary ground engaging tools secured thereto, means pivotally supporting said tool bar on said supporting frame, an operating handle pivotally mounted on the tool bar and conveniently operable from the driver's seat to operate said tool bar to swing the tools thereof into or out of engagement with the ground, and means made operable by swinging movement of said lever to lock said tool bar in operative position, when the tools are engaged with the ground, and also whereby the tool bar may be locked in inoperative position, when rotated to swing the tools out of the ground.

WILLIAM G. LUGER.